United States Patent [19]

Iman et al.

[11] Patent Number: 5,534,157
[45] Date of Patent: Jul. 9, 1996

[54] POLYETHER POLYAMINO METHYLENE PHOSPHONATES FOR HIGH PH SCALE CONTROL

[75] Inventors: Craig D. Iman, Cranberry Township, Pa.; Robert E. Tomilson, Portland, Me.

[73] Assignee: Calgon Corporation, Pittsburgh, Pa.

[21] Appl. No.: 338,016

[22] Filed: Nov. 10, 1994

[51] Int. Cl.$^6$ .................................................. C02F 5/14
[52] U.S. Cl. ............................ 210/700; 95/230; 95/235; 162/30.1; 162/48; 162/80; 210/701; 252/180; 422/15
[58] Field of Search ...................... 95/230, 235; 162/29, 162/30.1, 48, 63, 80; 210/698–701; 252/180; 422/15–17

[56] References Cited

U.S. PATENT DOCUMENTS

| | | | |
|---|---|---|---|
| 2,358,222 | 9/1944 | Fink et al. | 210/697 |
| 2,539,305 | 1/1951 | Hatch | 210/697 |
| 2,783,200 | 2/1957 | Ferris et al. | 210/701 |
| 2,917,528 | 12/1959 | Ramsey et al. | 260/438 |
| 2,964,549 | 12/1960 | Ramsey et al. | 260/438 |
| 2,980,610 | 4/1961 | Ruehrwein | 210/701 |
| 3,285,886 | 11/1966 | Gunderson et al. | 210/698 |
| 3,434,969 | 3/1969 | Ralston | 210/700 |
| 3,463,730 | 8/1969 | Booth et al. | 210/701 |
| 3,514,476 | 5/1970 | Morita | 260/429.9 |
| 3,518,204 | 6/1970 | Hansen et al. | 252/181 |
| 3,928,196 | 12/1975 | Persinaki et al. | 210/701 |
| 3,965,027 | 6/1976 | Boffardi et al. | 252/180 |
| 3,976,589 | 8/1976 | Mitchell | 252/180 |
| 4,053,352 | 10/1977 | Hultman et al. | 162/29 |
| 4,080,375 | 3/1978 | Quinlan | 210/700 |
| 4,299,652 | 11/1981 | Masuno et al. | 95/235 |
| 4,330,487 | 5/1982 | Redmore et al. | 210/700 |
| 4,457,847 | 7/1984 | Lorenc et al. | 210/698 |
| 4,617,129 | 10/1986 | Lees | 252/180 |
| 4,618,448 | 10/1986 | Cha et al. | 252/180 |
| 4,640,793 | 2/1987 | Persinksi et al. | 252/82 |
| 4,649,025 | 3/1987 | Hwa et al. | 422/15 |
| 4,650,591 | 3/1987 | Booth et al. | 210/700 |
| 4,671,888 | 6/1987 | Yorke | 252/180 |
| 4,689,200 | 8/1987 | Cook et al. | 422/15 |
| 4,818,506 | 4/1989 | Lin et al. | 210/700 |
| 4,834,955 | 5/1989 | Mouche et al. | 95/235 |
| 4,872,996 | 10/1989 | Grierson et al. | 210/700 |
| 4,931,189 | 6/1990 | Dhawan et al. | 210/700 |
| 4,936,987 | 6/1990 | Persinski et al. | 210/699 |
| 4,973,744 | 11/1990 | Hwa et al. | 210/700 |
| 4,977,292 | 12/1990 | Hwa et al. | 210/700 |
| 5,019,343 | 5/1991 | Hwa et al. | 422/16 |
| 5,051,532 | 9/1991 | Hwa et al. | 210/700 |
| 5,069,798 | 12/1991 | Hwa et al. | 210/700 |
| 5,087,376 | 2/1992 | Bendiksen et al. | 210/700 |
| 5,124,046 | 6/1992 | Sherwood et al. | 210/699 |
| 5,158,685 | 10/1992 | Freese | 210/699 |
| 5,262,061 | 11/1993 | Gill et al. | 210/700 |
| 5,300,231 | 4/1994 | Cha | 252/180 |
| 5,322,636 | 6/1994 | Schaper | 252/82 |
| 5,338,477 | 8/1994 | Chen et al. | 252/180 |
| 5,358,642 | 10/1994 | Chen et al. | 210/700 |
| 5,368,830 | 9/1994 | Alfano et al. | 423/29 |
| 5,378,368 | 1/1995 | Gill | 210/700 |

FOREIGN PATENT DOCUMENTS

| | | |
|---|---|---|
| 0384779 | 8/1990 | European Pat. Off. . |
| 0432664 | 6/1991 | European Pat. Off. . |
| 0437722 | 7/1991 | European Pat. Off. . |

OTHER PUBLICATIONS

Wayblex 61–A P. A. Hunt Chemical Corp.
Briquest 221–50A Albright & Wilson Technical Bulletin.

*Primary Examiner*—Peter A. Hruskoci
*Attorney, Agent, or Firm*—Craig G. Cochenour; Diane R. Meyers

[57] ABSTRACT

A method for inhibiting the formation, deposition, and adherency of scale-forming salts, including calcium sulfite, in process waters. The method is particularly suited for use in pulp mill lime kiln flue gas scrubber systems and multi-effect evaporators. Additionally, the method is effective at high pH and high calcium sulfite saturation levels.

20 Claims, 3 Drawing Sheets

Lime Kiln Scrubber System

POLYETHER POLYAMINO METHYLENE PHOSPHONATES FOR HIGH PH SCALE CONTROL

BACKGROUND OF THE INVENTION

1. Field of the Invention

The present invention relates to compositions and methods for inhibiting the formation, deposition and adherence of alkaline earth metal scale deposits, especially calcium sulfite ($CaSO_3$) scale deposits, on metallic surfaces of aqueous systems, especially under conditions of high pH and high calcite concentrations, e.g., those found in lime kiln flue gas scrubber systems, where those compositions comprise polyether polyamino methylene phosphonates.

Generally, calcium sulfite scale deposits are incrustation coatings which accumulate on the metallic surfaces of a water-carrying system through a number of different causes.

Various industrial and commercial water- carrying systems are subject to calcium sulfite scale formation problems. Calcium sulfite scale is of particular concern in paper mill process waters, particularly in lime kiln flue gas scrubber systems, such as those found in sulfate pulp mills, particularly where severe conditions including high pH and high calcium sulfite concentrations are encountered.

Lime kiln flue gas scrubbers serve two purposes; the removal of pollutants, such as $SO_2$, from the flue gas, and the reclamation of process chemicals for recycling in the pulping process. The scrubber removes both particulates and gases from the lime kiln exhausts. The particulates or dust comprise, for example, calcium oxide and calcium carbonate, while the gases being scrubbed comprise, for example, carbon dioxide and the oxidized TRS gases such as $SO_2$. The scrubber receives a spray of high pressure filtered water, which water removes the particulates, gases, and heat from the flue gas. The following chemical reactions are typical in the lime kiln flue gas scrubber water system:

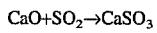
$CaO + SO_2 \rightarrow CaSO_3$

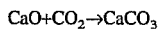
$CaO + CO_2 \rightarrow CaCO_3$

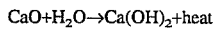
$CaO + H_2O \rightarrow Ca(OH)_2 + heat$

The salts produced in the above reactions, calcium sulfite and calcium carbonate, as well as calcium sulfate when excess oxygen is present, tend to precipitate on the surfaces of the flue gas scrubber system equipment.

The water employed in these systems ordinarily will contain a number of dissolved salts, and the alkaline earth metal cation calcium is usually prevalent, as is the anion carbonate. The combination product of calcium cation and sulfite, sulfate, and/or carbonate anion will precipitate from the water in which they are carried to form scale deposits when the concentration of the anion and cation comprising the reaction product, i.e., calcium sulfite, exceeds the solubility of the reaction product itself. Thus, when the concentrations of calcium ion and sulfite ion exceed the solubility of the calcium sulfite reaction product, a solid phase of calcium sulfite will form as a precipitate. Precipitation of the reaction product will continue until the solubility product concentrations of the constituent ions are no longer exceeded.

Numerous factors may be responsible for producing a condition of supersaturation for the reaction product calcium sulfite. Among such factors are changes in the pH of the water system, evaporation of the water phase, rate of heat transfer, amount of dissolved solids, and changes in the temperature or pressure of the system. For example, an increase in temperature of the aqueous system decreases the solubility of calcium sulfite and increases the evaporation rate of the water phase, increasing the concentration of undissolved calcium sulfite available for scale formation.

For lime kiln flue gas scrubber systems, deposition occurs on the inside walls of the scrubber itself, scrubber water sump tank, agitators, pumps, and related piping. The mechanism of scale formation is apparently one of crystallization of scale-forming salts from solution, primarily from evaporation of the scrubber water upon contact with hot flue gas, increasing the concentration of scale forming salts in the remaining scrubber water collected in the sump tank. Precipitation is also favored due to the heat transfer from the hot flue gases to the scrubber water, because of the inverse solubility relationship of calcium sulfite. As a result, the solubility of the scale-forming calcium sulfite salt reaction product is exceeded and crystallization of calcium sulfite scale results directly on the hot scrubber surface, particularly at the inlet and outlet of the scrubber.

The formation of calcium salt scale deposits poses a serious problem in a number of regards. Calcium salt scale formation facilitates corrosive processes, and a substantial calcium salt scale deposit will interfere materially with fluid flow. Consequently, calcium salt scale is an expensive problem in many industrial water systems, causing delays and shutdowns for cleaning and removal.

Although the present invention is directed primarily to preventing or inhibiting the deposition of calcium sulfite scale on lime kiln flue gas scrubber surfaces, the most prevalent type of scale deposit experienced on these surfaces, it is also applicable to inhibiting the deposition of other types of alkaline earth metal scales, on other surfaces exposed to aqueous systems, especially where those are associated with calcium sulfite scale under the severe conditions described herein. For example, most industrial and commercial water contains alkaline earth metal cations, such as calcium and magnesium, etc., and several anions such a bicarbonate, carbonate, and phosphate. When combinations of these anions and cations are present in concentrations which exceed the solubility of their reaction products, precipitates form until their product solubility concentrations are no longer exceeded. These precipitates are alkaline earth metal scales. Thus, as used herein, by "alkaline earth metal scales" and "scale forming-salts" is meant scales formed by true alkaline earth metals such as calcium and barium, but also salts of other metals such as magnesium and sodium, including, but not limited to, calcium sulfite, calcium sulfate, calcium carbonate, magnesium carbonate, burkeite ($Na_2CO_3 \cdot 2Na_2SO_4$) and calcium phosphate. These scales form frequently in the tubes of heat exchangers and on other heat exchange surfaces, such as those in cooling towers. Particular systems or applications areas where severe conditions lead to exceptional buildup of calcium carbonate and related scales in addition to cycled up cooling towers, include reverse osmosis systems, sugar refining evaporators, and certain types of gas scrubbers.

The polyether polyamino methylene phosphonates of the present invention are used in the same range of amounts as threshold inhibitors in the scale inhibition method of the present invention, rather than as sequestering or chelating agents, although the compositions of the present invention have dispersant and crystal modification properties as well and significantly reduce the adherency of any scale deposit which is formed, facilitating its easy removal.

Scale-forming compounds can be prevented from precipitating by inactivating their cations with chelating or sequestering agents, so that the solubility of their reaction products is not exceeded. Generally, this requires many times as much chelating or sequestering agent as cation, since chelation is a stoichiometric reaction, and these amounts are not always desirable or economical. However, several decades ago, it was discovered that certain inorganic polyphosphates would prevent such precipitation when added in amounts far less than the concentrations needed for sequestering or chelating.

When a precipitation inhibitor is present in a potentially scale-forming system at a markedly lower concentration than that required for sequestering the scale-forming cation (stoichiometric), it is said to be present in "threshold" amounts. See, for example, Hatch and Rice, *Indust. Eng. Chem.*, 31, 51–53 (1939); Reitemeier and Buehrer, *J. Phys. Chem.*, 44 (5), 535–536 (1940); Fink and Richardson U.S. Pat. No. 2,358,222; and Hatch, U.S. Pat. No. 2,539,305.

Similarly, anionic and cationic polymers can be used as dispersant in accordance with methods known in the art, but the dosage levels necessary to achieve dispersion are in the range of 0.5–1% by weight of the system being treated, which is many orders of magnitude higher that the dosage levels used for the compositions of the present invention. Thus, it is a unique aspect of the present invention that it is possible to achieve essentially nonadherent scale using only threshold inhibitor dosage levels of the composition of the present invention.

Recently, attention has been focused on controlling scaling under severe conditions, where conventional treatments such as those described above do not provide complete scale control. For example, the conventional treatments, such as use of polyacrylates or HEDP provide good calcium sulfate scale inhibition in the pH range of 3.0–7.0, but at higher pH ranges, such as pH 10 and higher, ranges typical for lime kiln scrubber water, these treatments form calcium salts and become ineffective.

Current technology in scale control can be used to inhibit $CaCO_3$ scale up to 100 to 120 times calcite saturation i.e. a water containing $Ca_+$ and $CO_3^{2-}$ present at 100 times ($100\times$) the solubility limit of calcium as calcite (calcite is the most common crystalline form of calcium carbonate). However, what is desired are inhibitors effective in greater than $150\times$ water, especially in greater than $250\times$ water, and more especially in greater than $300\times$ water, i.e., whether the calcite ions can be prevented from precipitating as calcium carbonate scale using substoichiometric amounts of an inhibitor. As used herein with respect to calcium saturation, the designation "X" when preceded by a numeral "Y," thus "YX," means the water being treated contains calcium in a concentration Y times the solubility limit of the particular calcium salt of interest for that particular water, taking into account the water temperature, pH, and any other variable known to those of ordinary skill in the art to affect calcium salt saturation levels in water. The compositions of the present invention are especially useful under severe conditions characterized by a calcite saturation level of $150\times$ and above, especially $250\times$ and above, and more especially $300\times$ and above, as defined in the paragraph immediately below.

Severity of the scaling tendency of a water sample is measured using the saturation index, which may be derived in accordance with the following equation:

$$SI = \frac{[Ca^{2+}][CO_3^{2-}]}{K\text{sp}CaCO_3}$$

where SI is the saturation index for calcium carbonate, $[Ca^{2+}]$ is the concentration of free calcium ions, $[CO_3^{2-}]$ is the concentration of free carbonate ions, and $^K\text{sp}CaCO_3$ is the conditional solubility product constant for $CaCO_3$. All of the quantities on the right side of the above equation are adjusted for pH, temperature and ionic strength.

Calculation and use of the saturation index, and generation of the data from which it is derived, are matter within the skill of the art. See, for example, *Critical Stability Constants*, Vol. 4: "Inorganic Complexes", Smith & Mantell (1976), Plenum Press; and *Aquatic Chemistry*, Chap. 5, 2nd ed., Stumm & Morgan (1981), Wiley & Sons.

In the case of calcium sulfite, as most other scaling salts, concentration of the scaling salt in the aqueous system dictates the degree to which scaling may occur. The effect of concentration is defined by:

$$K_{sp} = [Ca][SO_3]$$

where $K_{sp}$=solubility constant

[Ca]=concentration of Ca

[$SO_3$]=concentration of $SO_3$

If the product of the two concentrations exceeds the solubility constant, $K_{sp}$, then a driving force for the precipitation of calcium sulfite and scaling is present. This driving force can be expressed by the product of the concentrations divided by $K_{sp}$:

$$\text{Driving force} = \frac{[Ca][SO_3]}{K_{sp}}$$

Thus, a driving force of greater than 1 favors precipitation and scaling.

Another characteristic feature of the severe conditions under which the present invention is especially useful is high pH, i.e., a pH of 8.5 and higher, particularly a pH of 9 or 10 or even higher. A related feature of such severe conditions is high alkalinity.

One of the particular advantages of the scale inhibiting compositions of the present invention is the exceptional calcium tolerances which they exhibit. Calcium tolerance is a measure of a chemical compound's ability to remain soluble in the presence of calcium ions ($Ca^{2+}$). One of the parameters of scale control under severe conditions is pH. As pH increases, calcium tolerance decreases rapidly for traditional $CaCo_3$ threshold inhibitors, e.g., 1-hydroxy ethylidene 1,1-diphosphonic acid (HEDP) and amino tri (methylene phosponic acid) (AMP). These inhibitors precipitate with calcium at alkaline pH's, rendering them useless as threshold scale inhibitors. While it is common practice to use an acid feed to the water of, e.g., a cooling tower system in order to lower pH and thus avoid the calcium tolerance problem for conventional inhibits, the danger to handlers which such acid feeding poses makes it all the more important to find scale inhibitors which operate at high pH's.

2. Brief Description of the Prior Art

Early efforts to reduce scale formation in water-carrying systems employed compounds such as tannins, modified lignins, algins, and other similar materials. Chelating or sequestering agents have also been employed to prevent precipitation or crystallization of scale-forming calcium carbonate. Another type of agent which has been actively explored heretofore as a calcium carbonate scale inhibiting material is the threshold active inhibitor. Such materials are effective as scale inhibitors in amounts considerably less than that stoichiometrically required, and this amount, as already mentioned, is termed the threshold amount. Inorganic polyphosphates have long been used as such threshold active inhibitors. For examples of such materials, see Fink, U.S. Pat. No. 2,358,222; Hatch, U.S. Pat. No. 2,359,305; and Ralston, U.S. Pat. No. 3,434,969.

Certain water soluble polymers, including groups derived from acrylamide and acrylic acid have been used to condition water containing scale-forming calcium carbonate. For example, see U.S. Pat. Nos. 2,783,200; 3,514,476; 2,980,610; 3,285,886; 3,463,730; 3,518,204; 3,928,196; 3,965,027; and 4,936,987. In particular, there has been employed anionic polyelectrolytes such as polyacrylates, polymaleic anhydrides, copolymers of acrylates and sulfonates, and polymers of sulfonated styrenes. See, for example U.S. Pat. Nos. 4,640,793; 4,650,591; 4,457,847; and 4,671,888. When used as threshold alkaline earth metal scale inhibitors, however, large dosages of these polymers are required, which in turn increases operating costs.

While various polycarboxylates, including polyacrylic acid, have been used as scale inhibiting agents, as described above, no similar use has been made of polycationic agents, apparently because of the difference in electronic charge and the conventional theories of the mechanisms of action for polymeric threshold inhibitors and dispersant.

While polyether polyamino methylene phosphonates of the type which comprise an active ingredient of the compositions of the present invention are known, their use for the control of alkaline earth metal scale, particularly calcium sulfite scale, under severe conditions which include elevated pH and high calcium saturation levels, has not heretofore been suggested.

For example, U.S. Pat. No. 4,080,375 discloses methylene phosphonates of amino-terminated oxyalkylates for use as scale inhibitors, but these compositions are not the same as those of the present invention, nor is there any suggestion that such compositions would be useful under severe conditions as defined herein, where phosphonates such as HEDP and AMP give poor results. U.S. Pat. No. 4,931,189 discloses aminomethylene phosphonates of the type used in the method of the present invention, but for inhibiting oil field scale formation involving a high brine environment susceptible to gypsum or barite scale formation. Such use in no way suggests the control of scale under the severe conditions described herein under which the compositions and methods of the present invention operate with surprising success.

A particular phosphonate which has been marketed for scale control, but apparently not suggested for use under the severe conditions defined herein, is ethanolamine, N,N-dimethylene phosphonic acid, sold under such trademarks as WAYPLEX 61-A and BRIQUEST 221-50A, and described in EP-A00 384 779; U.S. Pat. No. 2,917,528; and U.S. Pat. No. 2,964,549.

U.S. Pat. No. 5,338,477 discloses the use of a polyether polyamino methylene phosphonate of the type which comprises an active ingredient of the present invention, but fails to disclose the effectiveness of this inhibitor for treating calcium sulfite.

SUMMARY OF THE INVENTION

The present invention relates to a composition useful as a deposit control agent to control the formation, deposition and adherency of scale imparting compounds including calcium sulfite in an aqueous system comprising a polyether polyamino phosphonate of the following formula:

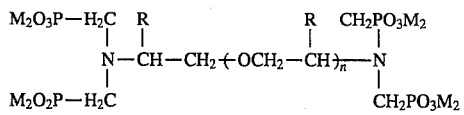

where n is an integer or fractional integer which is, or on average is, from about 2 to about 12, inclusive; M is hydrogen or a suitable cation; and R may be the same or different and is independently selected from hydrogen and methyl. A preferred subclass of compositions of the above formula is that wherein M is hydrogen, R is methyl, and n is from about 2 to about 3, most preferably an average of about 2.6.

The present invention also relates to a composition useful as a deposit control agent to control the formation, deposition and adherence of scale imparting compounds including calcium sulfite in an aqueous system comprising, in combination, a polyether polyamino methylene phosphonate of the formula above, together with one or more members selected from the group consisting of homo- and copolymers including terpolymers comprising one or more of acrylamide, acrylic acid, 2-acrylamide-methyl propane sulfonic acid, methacrylic acid (MAA), itaconic acid, polyethylene glycol monomethacrylate, maleic anhydride (MAH), maleic acid (MA), t-butyl acrylamide, sodium styrene sulfonate, sodium vinyl sulfonate, hydroxy propyl acrylate, hydroxy propyl methacrylate, 3-allyloxy-2-hydroxy propane sulfonic acid, sodium salt, and vinyl phosponic acid, wherein the weight average molecular weight for such polymer additives is in the range of from about 500 to 250,000. In particular, the present invention relates to such compositions wherein said polymer additive is a member selected from the group consisting essentially of, by weight, 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM. Unless otherwise specifically set forth herein to the contrary, all ratios and percentages are expressed on a weight basis.

The present invention further relates to a method of inhibiting the formation, deposition and adherence of scale-forming salts in an aqueous system, comprising the step of adding to said system an amount sufficient to establish a concentration of from 5 to 30 ppm active of a polyether polyamino methylenephosphonate of the formula above. In particular, the present invention relates to such a method in which calcium sulfite is the scale-forming salt.

The present invention further relates to a method of inhibiting the formation, deposition and adherence of scale-forming salts in an aqueous system, comprising the step of adding to said system an amount sufficient to establish a concentration of from 5 to 30 ppm active of a composition comprising a polyether polyamino methylene phosphonate of the formula above, together with one or more members selected from the group consisting of: homo- and copolymers including terpolymers comprising one or more of acrylamide (AM), acrylic acid (AA), 2-acrylamide-methyl propane sulfonic acid (AMPSA), methacrylic acid (MAA), itaconic acid (IA), polyethylene glycol monomethacrylate (PGM), maleic anhydride (MAH), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid, sodium salt (AHPS), and vinyl phosphonic acid, wherein the weight average molecular weight for such polymer additives is in the range of from about 500 to 250,000. In particular, the present invention relates to such a method in which calcium sulfite is the scale-forming salt, the aqueous system comprises a lime kiln flue gas scrubber system, said composition is added to the aqueous system being treated in an amount sufficient to establish a concentration of from 5 to 30 ppm active scale inhibitor, and said polymer additive is a member selected from the group consisting essentially of, on a weight percent basis, 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 Aa/AMPSA/PGM-5 (having 5 repeating oxyethylene units), and AA/AMPSA/TBAM.

These and other objects and advantages of the invention will become more readily apparent to those of ordinary skill in the art from the following Brief Description of the Drawings and the Drawings themselves, when taken in conjunction with the Detailed Description of the Invention.

BRIEF DESCRIPTION OF THE DRAWINGS

In the accompanying drawings, the presently preferred embodiments of the invention and preferred methods of practicing the invention are illustrated, by way of example but not limitation, in which.

DETAILED DESCRIPTION OF THE INVENTION

Figure 1:
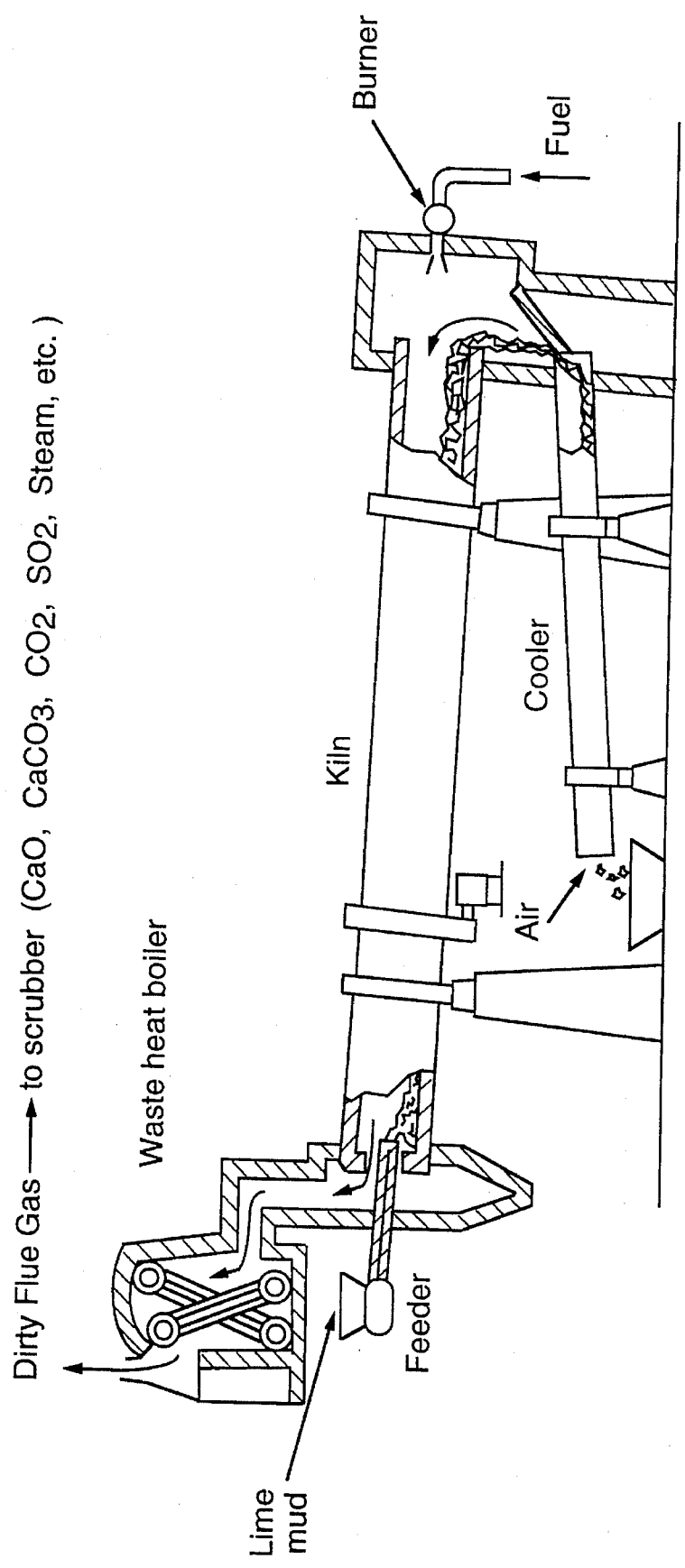
FIG. 1 illustrates schematically a typical single diameter rotary kiln, such as may be employed as a lime kiln used in pulp mill process chemical production and reclamation.

The composition of the present invention useful as a deposit control agent to control the formation, deposition and adherency of scale imparting compounds, including calcium sulfite, in an aqueous system comprises a polyether polyamino methylene phosphonate of the formula:

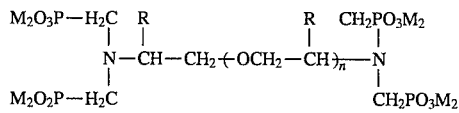

where n is an integer or fractional integer which is, or on average is, from about 2 to about 12, inclusive; M is hydrogen or a suitable cation such as alkali metal, ammonium, and suitable cations such as those occuring in alkali metal salts, ammonium salts, or ammonium derivative salts, for example; and each R may be the same or different and is independently selected from hydrogen and methyl.

A preferred subclass of compositions of the above formula is that wherein M is hydrogen, R is methyl, and n is from about 2 to 3, most preferably on average of about 2.6.

In order to obtain high levels of control of scale deposits, especially under the severe conditions defined herein, it has been found that there are certain essential components of the structure of the polyether polyamino methylene phosphonates of the present invention which are necessary to provide that performance. Thus, e.g., the tetra(aminophosphonate) portion of the structure is essential. Whether these groups are present initially in the phosphonic acid form or as a alkali metal or other salt of the acid, has no real bearing on the performance of the overall molecule. At the pH's under which the compositions of the present invention function, they are, and must be, in their ionized form. Thus, it is not critical whether "M" is hydrogen or a suitable cation, and the selection of an appropriate salt form is well within the skill of the art. In addition to alkali metal salts, ammonium salts: $NH_4^+$, or ammonium derivative salts: $NR_4^+$ (R-alkyl etc) or mixtures thereof may be used. Alkali metal salts are the most simple, and are preferred for that reason.

A desirable, although not essential structural feature of the polyether polyamino methylene phosphonates useful in the composition and methods of the present invention is the isopropyl group which bridges the diphosphonomethylamino group and the polyether group:

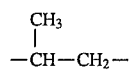

The isopropyl group has been found to provide enhanced scale inhibition activity under the severe conditions defined herein.

The next structural element of the polyether polyamino phosphonates to be considered is the polyether moiety:

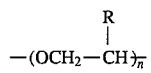

R may be hydrogen or methyl, and thus the polyether moiety is either polyoxyethylene or polyoxpropylene, with the polyoxypropylene being preferred. Since the polyether polyamino methylene phosphonates are prepared by phosphonomethylation of the appropriate diamine, the character of the polyether moiety will depend upon the way in which the amine starting material is made. Processes for making such polyether diamines are known in the art; and attention is directed particularly to U.S. Pat. No. 3,236,895, which describes preparation of a variety of polyether diamines especially useful in preparing the phosphonate final products are used as deposit control agents in the present invention.

In accordance with the processes set out in U.S. Pat. No. 3,236,895 and related processes described in the prior art, it is possible to prepare any one of a number of desired polyether diamines within the scope of the present invention. In the general formula for the polyether polyamino methylene phosphonates used herein, the polyether moiety is simply represented by the formula above. Since R may be hydrogen or methyl, both ethyleneoxy and propyleneoxy units are possible, as already mentioned. Moreover, R is to be independently chosen, i.e., ethyleneoxy and propyleneoxy units may alternate in various patterns, including blocks of each, or they may be all one or the other. For example, the following are just some of the polyether segments which might be prepared to form the basis for the corresponding diamines, which would then be used to make phosphonates within the scope of the present invention (where EO=ethyleneoxy, and PO=propyleneoxy):

EO; PO; EO-EO; PO-PO; EO-EO-EO;
PO-PO-PO; EO-EO-PO; EO-PO-PO; EO-PO-EO;
PO-EO-PO; EO-EO-EO-EO; PO-PO-PO-PO; EO-PO-PO-PO;
EO-EO-PO-PO; EO-EO-EO-PO; EO-PO-EO-PO;
EO-PO-PO-EO; PO-EO-EO-PO

In the above examples, "n" in the main formula would be an integer of from 1 to 4. Since "n" is defined as being from 1 to 12, an even larger number of possible polyether moieties is included. However, it has been found that generally the polyether polyamino methylene phosphonates of lower molecular weight, i.e., where "n" is a smaller integer, are those which provide the greatest amount of scale inhibition under the severe conditions of high pH and high calcite concentration, and thus are those which are preferred.

Examples of some of these preferred phosphonates are shown in the table below, where Z=methylenephosphonate:

$$Z_2-N-\overset{R_z}{\underset{|}{C}}HCH_2-(OCH_2\overset{R_a}{\underset{|}{C}}H)_a-(OCH_2\overset{R_b}{\underset{|}{C}}H)_b-NZ_2$$

| Id. No. | a | b | $R_z$ | $R_a$ | $R_b$ |
|---|---|---|---|---|---|
| A | 2 | 1 | $CH_3$ | H | $CH_3$ |
| B | 2.6* | 0 | $CH_3$ | $CH_3$ | — |
| C | 2 | 0 | $CH_3$ | $CH_3$ | — |
| D | 8.5* | 1 | $CH_3$ | H | $CH_3$ |
| E | 5.6* | 0 | $CH_3$ | $CH_3$ | — |
| F | 2 | 0 | H | H | — |
| G | 3 | 0 | H | H | — |
| H | 3 | 0 | $CH_3$ | $CH_3$ | — |
| I | 3 | 1 | H | $CH_3$ | H |
| J | 4 | 0 | H | $CH_3$ | — |

* = the value of "n" on average.

It will be noted from the table above that in several cases, "n" has an average value, i.e., the number of repeating ethyleneoxy or propyleneoxy units may vary. Thus, it is possible to have a mixture of varying chain lengths of polyoxyethylene or polyoxypropylene in the final product. This is also contemplated to be within the scope of the present invention, so long as the requirements with respect to the limit of "n" are observed. Consequently, while "n" is merely defined as an integer or fractional integer which is, or on average is, from about 2 to 12, it has two aspects. It defines the total of the number of repeating ethyleneoxy and/or propyleneoxy units considered separately, and thus if "n" is, e.g., 4, it includes 4 propyleneoxy units, 3 propyleneoxy units and 1 ethyleneoxy unit, 2 propyleneoxy units and 2 ethyleneoxy units, and so forth. The value of "n" may also represent an average number, and this is always the case, of course, when it is a fractional integer. In this case, for each of the ethyleneoxy and/or propyleneoxy units considered separately, mixtures of these units may be present so as to give an average value for "n". For example, in the table above, for Id. No. D, the total of "a" and "b" is 9.5, which is the value of "n". What is described is a mixture of polyether phosphonates in which all of them have isopropyl bridging group and an ethyleneoxy moiety, but the repeating propyleneoxy units are such that on average their value is about 8.5.

The number of repeating ethyleneoxy or oxypropylene units, designated by the subscript "n", determines the total molecular weight of the overall polyether polyamino methylene phosphonate, and thus plays a critical role in determining the scale inhibiting performance of that phosphonate. It has been found that in order to provide adequate scale control under the severe conditions of use defined herein, it is necessary that "n" be an integer or fractional integer which is, or on average is, from about 2 to 12, inclusive.

As discussed above, the reason for "n" being potentially a fractional integer arises from the fact that the primary diamine from which the polyether polyamino methylene phosphonates are prepared by phosphonomethylation may be a mixture of polyethers in which "n" is two or more of 2, 3,4, 5 and so forth, in varying proportions. For example, a preferred polyether polyamino methylene phosphonate for use in the compositions and methods of the present invention has a molecular weight of approximately 632 and the value of "n" on average is about 2.6. Thus, this type of polyether phosphonate has a molecular weight distribution, i.e., of the various polyoxypropylenes which make it up, and this distribution is represented by a fractional integer average value for "n". But, it is also within the scope of the present invention for "n" to be a whole integer, e.g., "3" which usually designates a single molecular weight and not a molecular weight distribution.

The polyether polyamino methylene phosphonates of the compositions and methods of the present invention are prepared first by phosphonomethylation of the appropriate primary diamine which already contains the polyoxyethylene and polyoxypropylene moieties.

Such primary amine starting materials and their method of preparation are well known. The phosphonomethylation of the primary diamine is then carried out by a Mannich reaction such as that described in K. Moedritzer and R. Irani, J. Organic Chem. 31(5) 1603–7, "The Direct Synthesis of alpha-Aminomethyl Phosphonic Acids; Mannich-Type Reactions with Orthophosphorous Acid", May 1966. In a typical reaction, the primary diamine is added to a mixture of phosphorous acid and water, and concentrated hydrochloric acid is then added slowly, after which the reaction mixture is heated to reflux with addition of aqueous formaldehyde.

Although the general structural formula employed herein indicates that the nitrogen atom is completely phosphonomethylated, as a practical matter, preparation of the polyether polyamino methylene phosphonates of the present invention, as described in detail further below, usually results in only about 80 to 90% phosphonomethylation. Other side products give N-substitution with H, $CH_3$, $CH_2OH$, etc. It is not practical, as a matter of simple production economics, however, to isolate and purify the completely phosphonomethylated compounds, since the side products just described do not interfere with scale deposit inhibition. Such side products, are consequently, usually allowed to remain, and the test data set out further below is based on test samples containing such side products. Consequently, the activity levels obtained would be even higher were 10% active compound being tested.

When any of the polyether polyamino methylene phosphonate compositions of the present invention are used to inhibit the precipitation, deposition, and adherence of scale-forming salts in an aqueous system, they can be effectively employed for that purpose when added in amounts sufficient to establish a concentration in said aqueous system of from 5 to 30 ppm active scale inhibitor. It is understood, however, that many factors, of the type which have been explained in detail with regard to the background to the present invention, will determine the actual amount of the polyether polyamino methylene phosphonate compositions of the present invention which will be added to any particular aqueous system in order to achieve the maximum amount of inhibition of alkaline earth metal, especially calcium sulfite scale formation, deposition and adherence in that aqueous system. The calculation and/or on-site determination of those amounts is well within the ordinary skill of the artisan in this field without undue experimentation When the polyether polyamino methylene phosphonate compositions of the present invention are used in combination with one or more of the polymers recited further above, the amounts of that combination which must be added in order to inhibit the formation, deposition and adherence of scale-forming salts in an aqueous system, will, as a general matter, be within the ranges of amounts sufficient to establish the ranges of concentrations of the polyether polyamino methylene phosphonates used alone, as recited in detail above. Again, however, calculation of the actual amount is well within the ordinary skill of the art without undue experimentation.

The phrases "inhibiting the precipitation" and "inhibiting the formation and depositions" are meant to include threshold inhibition, dispersion, solubilization, crystal modification, or particle size reduction. The phrases "inhibiting the adherence" and "increasing the non-adherence", are meant to define the formation of a scale deposit which is easily removed, e.g., by simple rinsing, i.e., a scale deposit which is not so firmly bonded to the surface to which it is attached that it cannot be removed by simple physical means, such as rinsing, as opposed to harsh mechanical (i.e., hydroblasting) or chemical (i.e., acid cleaning) treatment. The phrase "100% scale inhibition" refers to the prevention and/or absence of scale deposit formation on surfaces prone to scale formation, regardless of the mechanisms (i.e., inhibition, dispersion, crystal modification, and combinations thereof) whereby such deposit formation is prevented.

The phrase "scale-forming salts" is meant to include any of the scale-forming salts, including, but not limited to, calcium sulfite, calcium carbonate, calcium sulfate, calcium phosphate, calcium phosphonate (including calcium hydroxyethylidene diphosphonic acid), calcium oxalate, calcium fluoride, barium sulfate, burkeite, and magnesium salts.

The phrase "aqueous system" means commercial or industrial systems utilizing water, such as gas scrubbers, such as for example lime kiln flue gas scrubbers, evaporators, thermal conditioning equipment, and kraft pulping liquor processing systems (green liquor lines, storage tanks, black liquor systems, etc.). Of particular importance are those systems which operate under severe conditions as detailed herein, including high pH and high calcite concentrations. Typical of such systems are cycled up cooling towers, reverse osmosis systems, sugar refining evaporators, pulp mill multiple effect evaporators, pulp mill process water recycle systems, and certain types of gas scrubbers.

The manner of addition of any particular polyether polyamino methylene phosphonate composition of the present invention to an aqueous system will also be straightforward to a person of ordinary skill in this art. It may be added in liquid form by mechanical dispensers of known design. It may also be added in diluted liquid form. The polyether polyamino methylene phosphonate composition may also be combined with other chemical treatment agents for dispersing to the aqueous system; and these in combination may be dispensed in liquid form.

In the embodiments of the present invention described above, it has been contemplated that only a single polyether polyamino methylene phosphonate composition of those described above would be used for the purpose of inhibiting scale. However, it is also contemplated that one of these compositions could be combined with one or more polyelectrolytes so as to provide an even more effective product for the inhibition of scale under the severe conditions described herein.

For example, there could be used in such a combination one or more members selected from the group consisting of homopolymers, copolymers and terpolymers comprising one or more monomers of acrylamide (AM), acrylic acid (AA), 2-acrylamide-methyl propane sulfonic acid (AMPSA), methacrylic acid (MAA), ethoxylated methacrylate, itaconic acid (IA), polyethylene glycol monomethacrylate (PGM), maleic anhydride (MAH), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid (AHPS), and vinyl phosponic acid. Weight average molecular weights for such polymer additives should range from about 500 to 250,000.

For example, such compositions include copolymers of, on a weight percent basis, 90/10 to 10/90 AA/AMPSA, preferably 75/25 and 60/40 AA/AMPSA. Other preferred polymer additives for use with the polyether polyamino methylenephosphonates of the present invention include 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM.

Combinations using these polymers together with the polyether polyamino methylene phosphonate compositions of the present invention can increase the amount of scale control and deposit control which is achieved under the severe conditions described herein.

In addition to the polymer additives described above, the polyether polyamino methylene phosphonate compositions of the present invention can be used in further combination with yet other additives which increase their effectiveness. Thus, it is possible, and often desirable, to use one or more steel and/or copper corrosion inhibitors along with the polyether polyamino methylene phosphonate scale inhibitor in order to obtain corrosion rates which are acceptable. Acceptable corrosion rates depend on the circumstances surrounding each particular use environment, but will usually depend to a large degree on expectations with regard to the life expectancy of the equipment present in said environment. Also, acceptable corrosion almost always implies an absence of pitting attack type corrosion. The nature of the equipment involved will depend on the application area, but usually the metals from which such equipment is constructed and which are subject to corrosive attack, are primarily steel in its various common forms, including stainless steel, and copper itself or various alloys thereof, particularly brass. All of these metals are subject to corrosive attack, which, under the severe conditions of use of the compositions and methods of the present invention, may be even greater than the extent of corrosive attack which is experienced under more normal conditions; and, therefore, all of these metals will benefit from the use of one or more corrosion inhibitors in conjunction with the polyether polyamino methylene phosphonate scale inhibitors of the present invention.

With regard to corrosion inhibitors for steel and its alloys, it has been found that, surprisingly, not all corrosion inhibitors, including those which perform well with known phosphonate scale inhibitors used in the prior art, and might, therefore, be expected to provide adequate protection, are suitable for use with the polyether polyamino methylene phosphonate scale inhibitors of the present invention. This is yet another instance in which the polyether phosphonates of the present invention are characteristically unique. For example, it has been found that the molybdate and nitrite classes of corrosion protection, especially against pitting attack type corrosion, are not suitable for use with the polyether phosphonate scale inhibitors of the present invention.

On the other hand, there are numerous steel corrosion inhibitors which are suitable, and such suitability can be readily determined in accordance with the simple test procedures detailed in the description of preferred embodiments which follows. Thus, it is within the ordinary skill of the artisan to determine which steel corrosion inhibitors would be suitable, and all such inhibitors are contemplated to be a part of the present invention. Having carried out the test procedures referred to above, it has been determined that the following steel corrosion inhibitors provide adequate levels of corrosion protection, including protection against pitting attack type corrosion, when used in combination with the polyether phosphonate scale inhibitors of the present invention:

- hexametaphosphate,
- orthophosphate,
- pyrophosphate,
- hydroxyphosphonoacetic acid (HPA),
- 2-phosphonobutane-1,2,4-tricarboxylic acid (PBTC),
- manganese [$Mn(II)^{+2}$], and
- zinc [$Zn(II)^{+2}$].

Of the above steel corrosion inhibitors, the most preferred are hydroxyphosphonoacetic acid (HPA), orthophosphate+HPA, and HPA+PBTC.

The concentration of the steel corrosion inhibitor(s) which is required to provide adequate protection against corrosion will depend upon the makeup of the water in the aqueous system being treated, the pH, and the temperature. Generally, however, the desired concentration of the preferred inhibitors recited above will be in the range of from about 0.1 mg/L to about 100 mg/L, preferably from about 1 mg/L to about 25 mg/L, and most preferably from about 1 mg/L to about 10 mg/L. With regard to corrosion inhibitors for copper and its alloys, again it is possible to determine which copper corrosion inhibitors are suitable by utilizing the simple test procedures described in detail in the preferred embodiments further below. Using such procedures, it has been determined that the following are suitable copper corrosion inhibitors for use with the polyether polyamino methylene phosphonate scale inhibitors of the present invention:

- benzotriazole,
- tolyltriazole,
- 2-mercaptobenzothiazole,
- combinations of tolyltriazole and mercaptobenzothiazole as described in U.S. Pat. No. 4,675,158 higher alkylbenzotriazoles of the type described in EP-A-0 397 454, and combinations thereof as described in EP-A-0 462, 809,
- alkoxybenzotriazoles and combinations thereof as described in EP-A-0 478, 247, and
- phenyl mercaptotetrazole and combinations thereof as described in EP-A-0 462 666.

The concentration of the desired copper corrosion inhibitor which should be used will depend not only on the inhibitor itself, but on such other factors as the yellow metal surface area and total aqueous system volume, the concentration of dissolved and suspended copper, the pH, dissolved solids, and temperature as well. Generally, however, suitable copper corrosion inhibitors will be added in a range of concentrations from about 0.1 to about 100 mg/L, preferably from about 0.5 to about 20 mg/L, and most preferably from about 1 to about 5 mg/L.

EXAMPLES OF PREFERRED EMBODIMENTS

The following examples are presented for the purpose of illustrating the present invention, but are not intended to be in any way a limitation thereof.

EXAMPLE 1

$CaCO_3$ Scale Inhibition at pH 9 and 300× Calcite Saturation—Polyether Polyamino Phosphonates Alone In order to demonstrate the improved scale inhibition performance of the polyether polyamino methylene phosphonates used in the method of the present invention, the following procedure was used:

PROCEDURE: Scaling water containing 250 mg/L of $Ca^{+2}$ and 600 mg/L of alkalinity at a pH of 9.0 and 55° C. was used to evaluate scale inhibition performance of test solutions over a 24 hour period. Test solutions were analyzed by withdrawing 10 g of test solution and adding it to the appropriate container through a 0.2 m filter and titrating for calcium and calculating % inhibition by the Schwarzenbach method.

The polyether polyamino methylene phosphonates used as the test sample were the compositions of the secondary formula set out further above identified as Id No "A" through "J" including particularly Id. No. "B", which is the phosphonate of the main formula wherein both R's are methyl, M is hydrogen, n is 2.6 on average, and the resultant molecular weight is, on average, about 600. The results obtained are shown in the table of value below.

TABLE 1

| SAMPLE NO. | % $CaCO_3$ SCALE INHIBITION | | | | |
| --- | --- | --- | --- | --- | --- |
| | 20 ppm | 25 ppm | 30 ppm | 40 ppm | 50 ppm |
| A | 94 | — | 100 | — | 99 |
| B | 97 | 92 | 95 | 96 | 94 |
| C | 73 | — | 97 | — | 99 |
| D | — | 85 | — | — | 84 |
| E | — | 89 | — | — | 91 |
| F | — | 85 | — | — | 84 |
| G | 79 | — | 83 | — | 83 |
| AMP | — | — | — | — | 52 |

EXAMPLE 2

$CaCO_3$ Scale Inhibition at pH 9 and 300× Calcite Saturation—Polyether Polyamino Methylene Phosphonates In Combination with Polyelectrolytes Following the test procedures described in Example 1 above, the polyether polyamino methylene phosphonate of the present invention having a molecular weight of about 600 (n=2.6) was evaluated in combination with several polyelectrolytes. In addition, in order to evaluate the scale inhibiting activity of the combinations over a period of time, the % inhibition was calculated at 4 days, as well as at 24 hours. The results of those evaluations are set out in the table of values below.

TABLE 2

% CaCO$_3$ Scale Inhibition with Polyether Polyamino Phosphonate of Molecular Weight about 600 (n = 2.6) in Combination with Various Polyelectrolytes

| SAMPLE NO. | POLYELECTROLYTE | (ppm) | DOSAGE RATIOS OF POLYELECTROLYTE:PHOSPHONATE | | | | | |
|---|---|---|---|---|---|---|---|---|
| | | | 1.5:1 | 1:1 | 1:1.5 | 1:2 | 1:3 | 1:4 |
| 3 | 60/40 AA/AMPSA | 20 | 44.0 | — | 60.0 | — | 73.0 | 84.5 |
| | 24 Hour | 30 | 47.0 | — | 77.0 | 84.5 | 88.0 | — |
| | | 40 | 49.0 | 83.1 | 95.0 | 97.2 | 93.2 | — |
| | | 50 | 53.0 | 94.4 | 96.8 | — | 98.0 | — |
| 4 | 75/25 AA/AMPSA | 50 | | | | | | |
| | 24 Hour | | — | — | 95.7 | — | — | 97.1 |
| | 4 Day | | — | — | 78.3 | — | — | 91.3 |
| 5 | 50/50 SSS/MA (Versa TL-7) | 50 | | | | | | |
| | 24 Hour | | — | 94.1 | 95.6 | — | — | 92.6 |
| | 4 Day | | — | 70.6 | 94.1 | — | — | 88.2 |
| 6 | 75/25 AA/AHPS (Aquatreat CPA-III) | 50 | | | | | | |
| | 24 Hour | | — | 82.3 | 82.3 | — | — | 89.7 |
| | 4 Day | | — | 55.9 | 82.3 | — | — | 91.1 |
| 7 | 75/25 SSS/MA (Versa TL-4) | 50 | | | | | | |
| | 24 Hour | | — | 88.4 | 88.4 | — | — | 92.8 |
| | 4 Day | | — | — | — | — | — | 86.9 |
| 8 | 100 AA | 50 | | | | | | |
| | 24 Hour | | — | — | — | — | — | 92.8 |
| | 4 Day | | — | — | — | — | — | 79.7 |
| 9 | 33/33/34/AA/MAA/IA | 50 | | | | | | |
| | 24 Hour | | — | — | — | — | — | 88.4 |
| | 4 Day | | — | — | — | — | — | 59.4 |
| 10 | AA/AM (C-20) | 50 | | | | | | |
| | 24 Hour | | — | — | — | 85.5 | 91.3 | — |
| | 4 Day | | — | — | — | 78.3 | 72.5 | — |
| 11 | 70/20/10 AA/ AMPSA/PGM-5 | 20 | — | — | 77.0 | — | 72.0 | — |
| | | 30 | — | — | 88.0 | — | 85.0 | — |
| | 24 Hour | 40 | — | — | 88.0 | — | 96.0 | — |
| | | 50 | — | — | 91.0 | — | 96.0 | — |

VERSA TL-4 and TL-7, and AQUATREAT CPA-III are registered trademarks of National Starch & Chemical Corp., Bridgewater, N.J.

EXAMPLE 3

CaCO$_3$ Scale Adherence

The polyether polyamino methylene phosphonate of the present invention having a molecular weight of about 600 (n=2.6), as well as combinations with various polyelectrolytes, were tested for their ability to control scale adherence on heat transfer surfaces.

Equipment

Apparatus loop includes a hot bath, a cold bath and 3 cells. Each cell consists of a jacketed beaker equipped with heat transfer "U" tube (Admiralty Brass), pH controller, level controller, thermometer, air vents and make-up tank. The total volume was 950 ml.

Procedures

1. Tubes precleaned with 50:50 HCl:H$_2$O, rinsed with deionized H$_2$O, and scoured with a nylon pad.
2. Water baths for the jacketed beaker and U tube are set to maintain temperature of bulk water at 50°–55° C.
3. Position "U" tubes in lids so that the same amount of tubing is exposed in each cell.
4. Add enough preheated H$_2$O to cover pH electrode bulb; add desired amount of inhibitor solution; add 120 mg/L of Ca$^{++}$. Adjust pH to 7.5±0.1 using 1.0N NaOH.
5. Mix volume alkalinity solution to give 180 mg/L HCO$_3$ with the remaining preheated H$_2$O and immediately add to the cell. pH should rise to 9.0±0.1.
6. Air flow is adjusted to give an evaporation rate of ⅔ L/day.
7. Makeup tank contains stable solution of 60 mg/L Ca$^{++}$ and 90 mg/L HCO$^-_3$ which is added on demand as the water in the jacketed beaker evaporates. This concentrates and supersaturates the Ca$^{++}$:CO$_3$=. The test is run for five to six days to concentrate the solution until 325 mg/L Ca$^{++}$ and 486 mg/l HCO$^-_3$ are present, pH 9, 55° C. to give approximately 300 times CaCO$_3$ saturation.
8. Once the appropriate supersaturation is attained, the makeup tank is switched to deionized water and the tests are contained for 24 hours. Total test time is 6 days.

Deposit Analyses:

Rinse any deposit or coating from tube with 1:3 HCl:H$_2$O into beaker, and wash tube well with distilled H$_2$O into same beaker. Neutralize washing to pH 4–7 with conc. NaOH solution. Transfer to 250 ml volumetric; dilute to mark. Analyze 25 ml aliquots for Ca by titrating with 0.01M EDTA solution. Reporting as mg Ca tube deposit.

Using the procedure described above, the deposit weights obtained were illustrated in Table 3 below.

TABLE 3

CaCO₃ Scale Adherence with Polyether Polyamino Phosphonate of Molecular Weight about 600 (n = 2.6) in Combination with Various Polyelectrolytes at a Dose of 25 mg/L Active

| TREATMENT (mg) | RATIO | Ca (mg) | TUBE DEPOSIT Phosphonate |
|---|---|---|---|
| Control | | 65.0 | |
| Exp. 1 alone | | 3.89 | |
| Exp. 1 + 60/40 AA/AMPSA | 3:1 | 0.64 | 0.39 |
| | 4:1 | 0.56 | 0.35 |
| Exp. 1 + 50/50 SSS/MA (Versa TL-7) | 1.5:1 | 0.70 | 0.40 |
| | 4:1 | 1.3 | 0.68 |
| Exp. 1 + 70/20/10 AA/AMPSA/PGM-5 | 4:1 | 0.96 | 0.50 |

The above test results indicate great improvement over the blank and substantial improvement in activity compared to the polyether polyamino methylene phosphonate used alone.

EXAMPLE 4

Pilot Cooling Tower

Further testing of the ability of the polyether polyamino methylene phosphonate compositions of the present invention to prevent deposits was performed in a pilot cooling tower. This pilot cooling system contains two separate test systems: identified as Side A and Side B. Each side consists of a recirculating cooling tower with four single tube heat exchangers connected in series. The heat exchangers comprise ¾" stainless steel and ½" admiralty brass tubes. The flow rate through the system was 3.0 gpm producing linear velocities of 2.9 and 7.5 ft/sec through the tube heat exchangers. The inlet temperature to the first tube heat exchanger was 100° F. and the outlet temperature at the fourth tube heat exchanger was 133° F., for a WT of 23° F. at 10,000 BTU/hr-ft². Treatments used were 25 mg/L active: polyether polyamino methylene phosphonate of molecular weight about 600 (Example 1) in Side A; 25 mg/L active: a commercial product consisting of 1:2 of HEDP/AMP combined at 1.5:1 with 60/40 AA/AMPSA in Side B. The same makeup water as used in Example 3 was used in the test. The systems were cycled up to 5.4 cycles of concentration giving a target of 300× (times) calcite saturation. The systems were held at the target cycles by controlling the conductivity of the water for 24 days. The pH was not controlled by acid, but allowed to establish its own equilibrium. After 24 days the heat transfer tubes were pulled and deposit weights for the two treatments determined. Results were as follows:

TABLE 4

Total Deposit Weights from 12" Cross-Sections

| Treatment A | Exp. 1 | 0.0973 g |
| Treatment B | HEDP/AMP/AA/AMPSA | 5.55 g |

The scale inhibitor of the present invention reduced the deposit compared to conventional treatment by a factor of 570.

EXAMPLE 5

Preparation of N,N,N',N'-Tetramethylene Phosphono Polyoxypropylene Diamine

A diamine having an average molecular weight of about 230 and having the structural formula: $H_2NCH(CH_3)—CH_2—[—OCH_2CH(CH_3)—]_{2.6}—NH_2$ (56.2 g) was added to a mixture of phosphorous acid (82 g) and deionized water (65 g) in a one liter resin flask fitted with a condenser, a Teflon stirrer, a thermometer and an additional funnel. It is important to maintain as low a level of iron (Fe) in the reaction as possible, and the most likely source of Fe is the phosphorous acid. The Fe interferes somewhat with the reaction, and consequently a low Fe content phosphorous acid is employed.

There was then added slowly to the reaction mixture 50 mL of concentrated HCl. The reaction mixture was subsequently heated to reflux (107° C.). The temperature should be at least 95° C., but the best results are obtained when the reaction mixture is heated to reflux. After the reaction mixture reached reflux, there was added 150 g of 37% aqueous HCHO, which was added dropwise over a period of about 45 min. In order to obtain the best results, the ratio of HCHO to diamine starting material should be at least 4:1 on a molar basis, and preferably somewhat higher, as was the case in this synthesis.

The reaction mixture was then refluxed for an additional period of 3 hrs. While the reaction time depends upon temperature, best results are obtained by refluxing for at least ½ hr, preferably 2 to 3 hrs.

The reaction mixture was then cooled, at 97.2 g of volatiles were stripped off at 50° C. using a rotary evaporator. A total of 303.4 g of product was obtained, with a theoretical activity of 48%. $P_{31}$NMR indicated that at least about 85% of the —NH groups has been phosphonomethylated. Impurities included unreacted phosphorous acid, formaldehyde, phosphoric acid, methanolphosphonic acid, and other unidentified phosphorous compounds.

It has been found that the scale control performance of the polyether polyamino methylene phosphonates of the present invention depends to some extent, although not a very significant extent, on the variations in the process parameters described above. Best results are obtained, consequently, by employing the optimum conditions as outlined above.

EXAMPLE 6

Combinations with Steel Corrosion Inhibitors

Corrosion test procedures were carried out in an 8L vessel fitted with a heater having a temperature controller, a pump to circulate the water in the test apparatus, a pH monitor and controller to maintain the desired pH, and an aerator to both ensure air saturation, and to introduce carbon dioxide gas as required for pH control. The steel coupon specimens for the test were composed of 1010 carbon steel (UNS designation G10100), and these were immersed in the water of the test apparatus. Corrosion penetration rates in mils per year (mpy) were determined gravimetrically after 7 days by the standard ASTM-G1-88 method. The composition of the water used in the test apparatus was as follows:

| | Ion | Conc. (mg/L) |
|---|---|---|
| | Ca | 208 |
| | Mg | 128 |
| | Cl | 416 |
| | $SO_4$ | 1025 |
| | $SiO_2$ | 14 |
| Alkalinity as $CaCO_3$ | | 498 |
| Polymer dispersant | | 5 |

[The polymeric dispersant is a random copolymer of approximately (by weight) 70% acrylic acid, 30% acrylamido-(2-methylpropane-1-sulonic acid), and 10% acrylic acid ester of 1-hydroxy-penta-ethyleneoxide.] The water described above was maintained at a pH of 8.5 and the polyether phosphonate scale inhibitor was the composition used in Example 1 above, which was tested alone, as well as in combination with various steel corrosion inhibitors. The results obtained are shown in the following table of values.

TABLE 6

Steel Corrosion Rates at pH 8.5

| TREATMENT | CONC. (mg/l) | CORROSION RATE (mpy) | SPECIMEN APPEARANCE Before Removing Corr. Products | After Removing Corr. Products |
|---|---|---|---|---|
| Exp. 1 | 20.4 | 4.0 | Dense black spots | pitting |
| Exp. 1 + Zn | 20.4 3 | 3.0 | Dense black spots | pitting |
| Exp. 1 + molybdate | 20.4 | 6.4 | Dense black nodules | pitting |
| Exp. 1 + nitrite + PBTC | 20.4 100 10 | 3.7 | Dense black nodules | pitting |
| Exp. 1 + HPA | 20.4 10 | 0.9 | only slight fine brown spots | no pitting |

EXAMPLE 7

Lime Kiln Flue Gas Scrubber System

A northeast kraft pulp mill was experiencing deposition of scale in certain areas of its lime kiln flue gas scrubber system. The mill's previous treatment, using a scale inhibitor known as CUSTOMSPERSE and sold by Betz, resulted in scale formation after two weeks of operation, requiring shutdown and cleaning. The areas on which deposits were found are illustrated in the shaded areas of FIG. 2, and include the inlet and outlet regions of the flue gas scrubber, the scrubber sump tank inlet line, and the scrubber sump tank pump outlet line. Scrubber water from the sump tank 10 of FIG. 2 was collected for analysis, which analysis revealed the characteristics set forth in Table 7.

TABLE 7

| Parameter | Lime Kiln Scrubber Sump Tank |
|---|---|
| pH @ 22° C. | 10.1 |
| P Alkalinity as CaCO$_3$, ppm | 100 |
| M Alkalinity as CaCO$_3$, ppm | 7200 |
| Total Solids @ 105° C., % | 0.91 |
| Dissolved, Cl, ppm | 13 |
| Dissolved Ortho PO$_4$, ppm | <8 |
| Dissolved SO$_4$, ppm | 378 |
| Dissolved Oxalate, C$_2$O$_4$ | <8 |
| Dissolved Ca, ppm | 3200 |
| Total Ca, ppm | 3200 |
| Dissolved Mg, ppm | 14 |
| Total Mg, ppm | 80 |
| Dissolved Fe, ppm | <0.4 |
| Total Fe, ppm | 11 |
| Dissolved Cu, ppm | <0.2 |
| Total Cu, ppm | <0.2 |
| Dissolved Al, ppm | <0.4 |
| Total Al, ppm | 10 |
| Dissolved Ba, ppm | <0.1 |
| Total Ba, ppm | 1.6 |
| Dissolved Zn, ppm | <0.2 |
| Total Zn, ppm | 3.2 |

Figure 2:
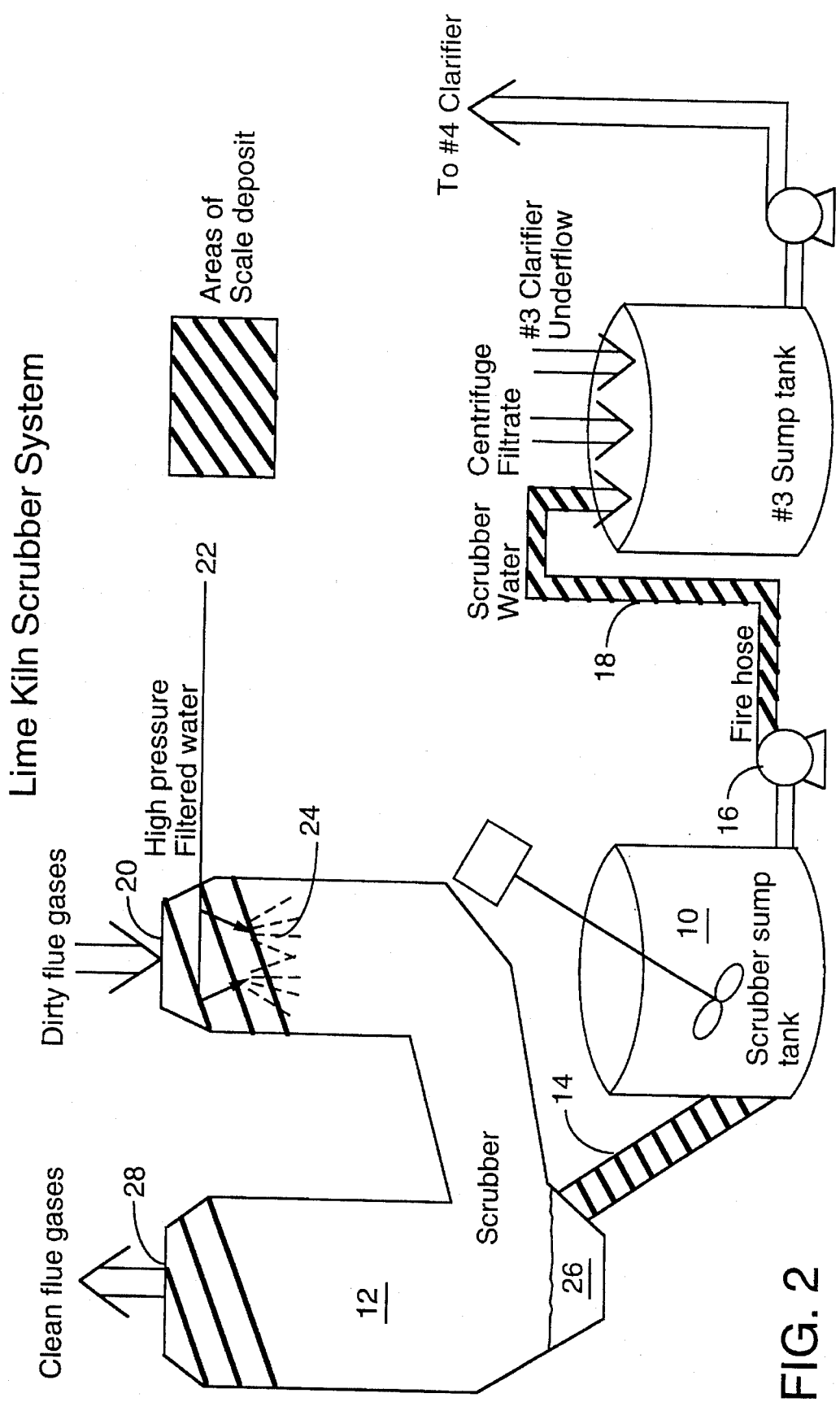
FIG. 2 is a schematic illustration of a typical lime kiln scrubber system, depicting shaded areas representing scale deposits observed in a sulfite pulp mill lime kiln flue gas scrubber system.

Analysis over a period of months of the scrubber 12, scrubber drop leg 14, scrubber sump tank 10, sump tank pump 16, and firehose 18 revealed that the deposits collecting in the shaded areas of FIG. 2 comprised approximately 65–90% CaSO$_3$ and approximately 1–20% CaCO$_3$. In the flue gas scrubber system in FIG. 2, dirty flue gasses, for example, from a lime kiln, FIG. 1, are directed into the inlet 20 of the scrubber 12. An aqueous solution, which may be high pressure filtered water 22, is sprayed into the scrubber 12 in the path of the dirty flue gas entering the scrubber inlet 20. Spray nozzles well known to those of ordinary skill in the art may be used for this purpose, producing a shower spray 24. The aqueous solution spray 24 is preferably at a temperature which encourages the contaminants being removed from the dirty flue gas to be dissolved in the aqueous spray 24. Of course, many contaminants will not be dissolved, rather, will be entrained within the aqueous solution 24 along with dissolved contaminants, and will collect at the base 26 of the scrubber 12 and be carried by gravity through a drop leg 14 into the scrubber sump tank 10. Meanwhile, clean flue gasses exit the outlet 28 of the scrubber as illustrated, and are vented using stacks, as is well known to those of ordinary skill in the art.

Although the sump tank scrubber water illustrated in Table 7 had a pH of 10.1, the present invention is useful within a variety of pH ranges, including pH of 8.5–12.0. In general, the aqueous systems of the present invention being treated will have a pH of 9.0 and higher, and, in the case of black liquor aqueous systems, generally pH 10 and higher and mainly 10.5 and higher.

The scrubber sump tank 10 collects the dirty aqueous solution containing the contaminants removed from the dirty flue gas by the scrubber 12.

As is apparent from the shaded regions of FIG. 2, scale deposits were prominent in the lime kiln scrubber system, and were required to be removed with severe cleaning steps, such as hydroblasting and/or acid cleaning.

A number of approaches could be used to remove the calcium sulfite scale deposits from the scrubber system of FIG. 2, including reducing the calcium concentrations, reducing the sulfite concentrations, changing the calcium sulfite to calcium sulfate (which is 100 times more water soluble than calcium sulfite), increasing the dilution of the scrubber water, and changing the water conditions in the scrubber sump 10.

Calcium enters the system illustrated in FIG. 2 via kiln dust carried into the scrubber with the dirty flue gas. One way to reduce the calcium input to the system is to reduce the kiln dust generation. One way of accomplishing this is by increasing the sodium content of the lime mud fed to the kiln illustrated in FIG. 1. This will cause the lime to form small nodules rather than dust, but creates a risk of ring formation in the kiln. One method of adding sodium to the lime mud (which already includes some sodium) is by adding $Na_2SO_4$; NaOH; or $Na_2CO_3$ to the feeder of the kiln illustrated in FIG. 1. Caution should be used, however, in adding sodium to the lime kiln, as too much sodium can create severe problems in kiln operation.

Sulfite reduction may be achieved by reducing the TRS gas generation or burning the TRS in a recovery boiler. Although both methods would reduce the scaling potential of the scrubber system, each is quite capital intensive.

Yet another way to reduce the deposition of calcium sulfite is to alter the chemistry of the system so as to favor the formation of calcium sulfate, which is 100 times more soluble than calcium sulfite. In order to do this, it is necessary to increase the oxygen, and hence the airflow, in the kiln illustrated in FIG. 1. This, however, increases the B.T.U. requirements of the kiln, resulting in increased energy consumption and operating cos E. Accordingly, most lime kilns prefer to operate as oxygen-lean as possible, making conversion of $CaSO_3$ to $CaSO_4$ an economically unattractive option.

Figure 3:
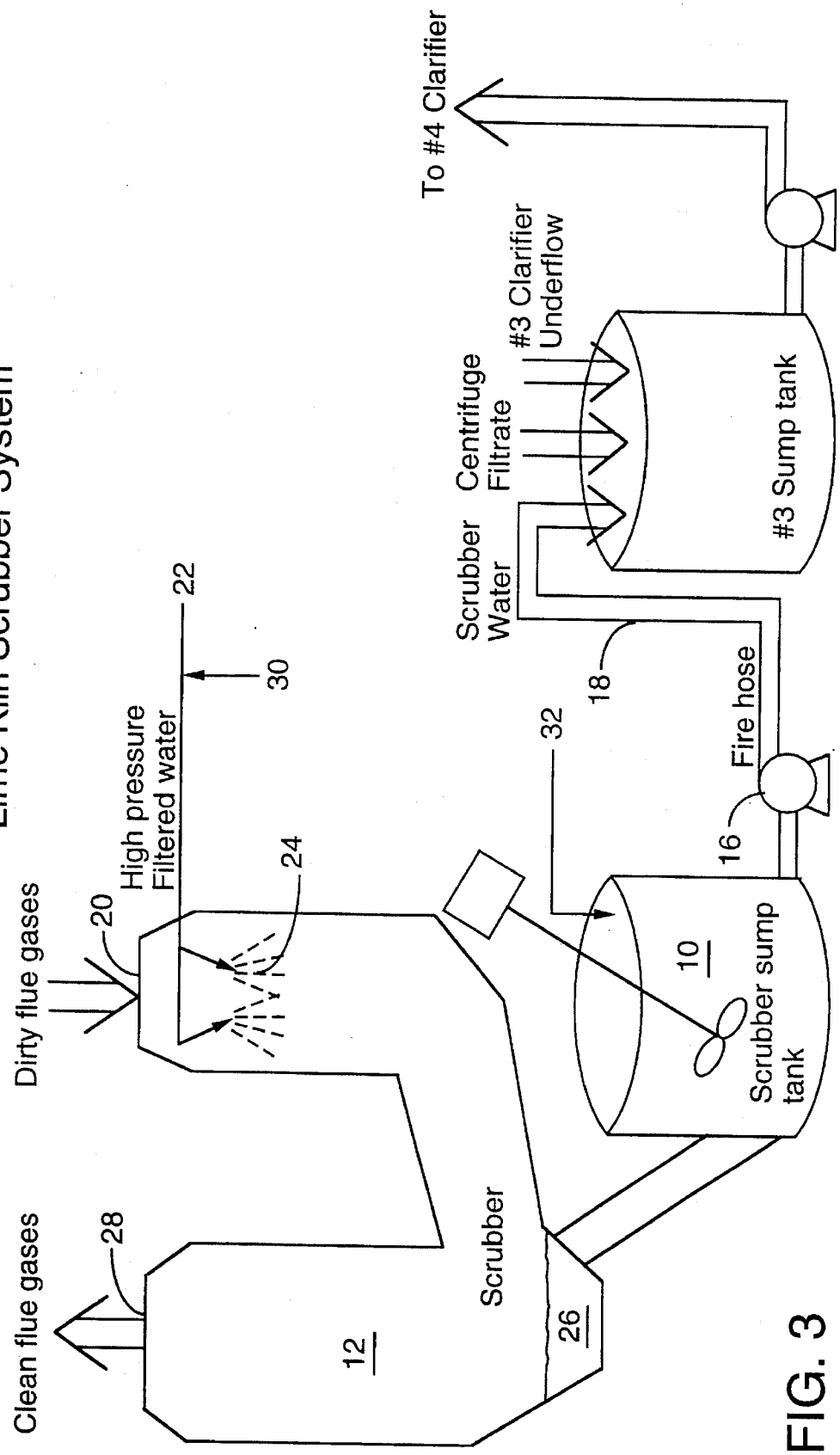
FIG. 3 illustrates a schematic representation of a preferred method of practicing the present invention.

Because scale deposition is a function of concentration of the scaling salt in the solution of interest, another way to reduce scaling is to increase the dilution of that scaling salt. One way to do this is to decrease the amount of material dissolved; another is to increase the volume of solution. This, however, results in a requirement for increased water volume usage and treatment, potentially resulting in more or larger holding tanks, clarifiers, etc. FIG. 3 illustrates a treatment method of the present invention which has eliminated the formation, deposition and adherency of scale-forming salts, including calcium sulfite, from the lime kiln flue gas scrubber system illustrated in FIG. 2. In the embodiment of FIG. 3, the scale inhibitors of the present invention set forth herein are fed to the aqueous solution 22 through a feed line 30. Preferably, the scale inhibitors of the present invention are split fed, with another feed stream 32 being fed to the scrubber sump tank 10 as illustrated. The precise ratio of split feed is not critical, and optimization of split feeding is well within the level of ordinary skill in the art. Split feeding is done to control scale formation in several locations and the ratio of split is determined by the relative scale forming tendencies experienced in those locations.

In a preferred embodiment of the invention, the scale inhibitor comprises a blend of 5% by weight TRC-289 and 15% by weight TRC-271, available from Calgon Corporation, Pittsburgh, Pa. In a most highly preferred embodiment of the invention, the scale inhibitor comprises a polyether polyamino methylene phosphonate and polymer mixture, such as previously described, available as 34% active TRC-289 solution, available from Calgon Corporation.

As used herein, the term "parts per million" or "ppm" refers to parts on a weight basis of scale inhibitor per million parts on a weight basis of the aqueous system being treated, unless otherwise specified. The precise and optimal treatment feed rates of scale inhibitors of the present invention will vary from one process water to the next, and may vary over time with the same process water, depending on variable aqueous systems conditions, such as pH, calcium sulfite saturation level, temperature, presence of multiple scaling salts, etc. As will now be readily appreciated, the optimal scale inhibitor feed rates of any particular aqueous system will therefore be variable, and will be well within the ability of those ordinarily skilled in the art to determine without undue experimentation. In general, in the case of treating calcium sulfite-containing aqueous systems, as the $CaSO_3$ saturation level and/or temperature and/or pH of the aqueous system increases, the feed rate requirements of scale inhibitor needed to provide 100% scale inhibition also increases, as will now be readily apparent to those of ordinary skill in the art. In general, for most aqueous systems of the type described herein, a feed rate of 5–30 ppm active TRC-289 will be beneficial, particularly when fed to shower water for a lime kiln flue gas scrubber, to control calcium sulfite. Other applications may, of course, require different feed rates.

In the case of the use of the blend of 5% TRC-289 and 15% TRC-271 (by weight), a split feed rate of 29 parts per million to the shower water 22, and 59 parts per million to the sump tank 10 has proven beneficial. In the case of the use of 34% TRC-289 solution, a feed rate of 16 ppm, active TRC-289, based on a spray shower flow of 125 gpm, has proven to be highly preferable.

EXAMPLE 8

A northeast pulp and paper mill was experiencing calcium sulfite deposition in its aqueous systems, including its lime kiln flue gas scrubber system. The aqueous system from the sump tank, i.e., dirty water collected from the scrubber shower water, had a pH of 11.5–12.0. The calcium sulfite saturation ran as high as 400 times saturation level, although could reasonably be expected to vary down to 100 times saturation level. Treatment of the aqueous system with a split feed of 5–30 ppm active TRC-289 and preferably 15 ppm active TRC-289 at the shower water and preferably 33 ppm active TRC-289 at the scrubber sump tank, resulted in 100% scale inhibition for more than ten weeks of operation.

While the mechanisms by which the formation, deposition, and adherency of scale-forming salts by the scale inhibitors of the present invention are not completely understood, it is believed that threshold inhibition, crystal modification, and dispersion play significant roles in the marked scale reduction achieved.

Threshold inhibition involves the substoichiometric inhibition of formation of the calcium sulfite molecule which forms according to the equilibrium reaction

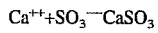
$$Ca^{++} + SO_3^{=} \rightleftharpoons CaSO_3$$

Thus, it is preferred that the scale inhibitors of the present invention be fed to the aqueous system being treated before that aqueous system reaches the thermodynamic equilibrium concentration. For this reason, feeding scale inhibitor to the aqueous system prior to the shower spray of the lime kiln flue gas scrubber, as illustrated in FIG. 3, is most preferred. In the case of multiple effect evaporation, for example, in the case of black/green liquors, the scale inhibitor is ideally fed prior to the first effect, when the liquor being concentrated is most dilute with scale forming salts.

Crystal modification disrupts the crystalline structure of the scale, preventing scale formation. If deposits do form, the crystal molecules are more weakly bonded together, the modified structure of the crystals therefore being "softer" and more easily removed. For this reason, feeding the scale inhibitors of the present invention directly to areas in which large volumes of scale forming salts might collect, such as sump tanks, is beneficial.

Dispersion prevents agglomeration and deposition of individual calcium sulfite molecules and small calcium sulfite crystals. Dispersion effects are improved if the scale inhibitor is fed to the aqueous system being treated prior to the aqueous system experiencing an increase in sulfite ions, and close to areas of scale deposition before high shear areas, such as nozzles or pumps. For this reason, in the case of lime kiln flue gas scrubber systems, feeding scale inhibitors prior to spray nozzles and pumps as illustrated in FIG. 3 is beneficial.

This invention and many of its attendant advantages will be understood from the foregoing description, and it will now be apparent to those of ordinary skill in the art that various modifications and changes can be made to the method for inhibiting formation, deposition and adherency of scale without departing from the spirit and scope of the invention or sacrificing all of its material advantages, the methods hereinbefore described being merely presently preferred embodiments. Accordingly, it is to be understood that the invention is to be better realized from the attached claims and the full scope of equivalents to which each is entitled. Additionally, the present invention has been described above in terms of representative figures and embodiments, intended to be illustrative and enabling to those of ordinary skill in the art, but not self-limiting. Furthermore, while many objects and advantages of the invention have been set forth, it is understood and intended that the invention, and all exclusive rights thereto, is defined by the full scope of the following claims, and not by the objects and advantages.

What is claimed is:

1. A method of inhibiting the formation, deposition and adherence of calcium sulfite in an aqueous system of a pulp and/or paper mill, wherein said aqueous system has a pH of at least 8.5 and a calcium sulfite saturation level of at least 150 times the solubility limit of calcium sulfite in said aqueous system, comprising the step of adding to said system an amount sufficient to establish a concentration, on an active basis, of from 5 to 30 ppm of a polyether polyamino methylene phosphonate of the formula:

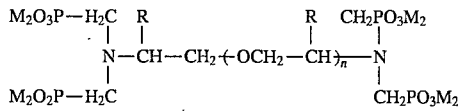

where n is an integer or fractional integer which is, or on average is, from about 2 to about 12, inclusive; M is hydrogen or a suitable cation; and each R may be the same or different and is independently selected from hydrogen and methyl.

2. A method according to claim 1 wherein formation, deposition and adherence of calcium carbonate is also inhibited.

3. A method according to claim 1 wherein for the phosphonate composition, M is hydrogen, both R's are methyl, and n is about 2.6, with a resultant molecular weight of about 600.

4. A method according to claim 1 where the phosphonate composition has the following structure, where "Z" is methylenephosphonate:

$$Z_2-N-CHCH_2-(OCH_2CH)_a-(OCH_2CH)_b-NZ_2$$
$$\quad\quad\quad\ \ |\quad\quad\quad\quad\quad\ \ |\quad\quad\quad\quad\ \ |$$
$$\quad\quad\quad R_z\quad\quad\quad\quad\quad R_a\quad\quad\quad\quad R_b$$

| a | b | $R_z$ | $R_a$ | $R_b$ |
|---|---|-------|-------|-------|
| 2 | 1 | $CH_3$ | H | $CH_3$ |
| 2 | 0 | $CH_3$ | $CH_3$ | — |
| 8.5* | 1 | $CH_3$ | H | $CH_3$ |
| 5.6* | 0 | $CH_3$ | $CH_3$ | — |
| 2 | 0 | H | H | — |
| 3 | 0 | H | H | — |
| 3 | 0 | $CH_3$ | $CH_3$ | — |
| 3 | 1 | H | $CH_3$ | H |
| 4 | 0 | H | $CH_3$ | — | and wherein *=the value of "n" on average.

5. The method according to claim 1 additionally including adding to said system a steel corrosion inhibitor and a copper corrosion inhibitor.

6. The method according to claim 5 wherein the steel corrosion inhibitor is hydroxyphosphonacetic acid (HPA), and the copper corrosion inhibitor is tolytriazole.

7. The method of claim 1 wherein said polyether polyamino methylene phosphonate is added to said aqueous system, together with one or more homopolymers, copolymers and terpolymers comprising one or more monomers of acrylamide (AM), acrylic acid (AA), 2-acrylamide-methyl propane sulfonic acid (AMPSA), methacrylic acid (MAA), ethoxylated methacrylate, itaconic acid (IA), polyethylene glycol monomethacrylate (PGM), maleic anhydride (MA), maleic acid (MAH), t-butyl acrylamide, sodium styrene sulfonate (SSS), sodium vinyl sulfonate, hydroxy propyl, acrylate, hydroxy propyl methacrylate, 3-allyloxy-2-hydroxy propane sulfonic acid (AHPS), and vinyl phosphonic acid, wherein the weight average molecular weight for such polymer additives is in the range of from about 500 to 250,000.

8. A method of inhibiting the formation, deposition and adherence of calcium sulfite in an aqueous system of a pulp and/or paper mill, wherein said aqueous system has a pH of at least 8.5 and a calcium sulfite saturation level of at least 150 times the solubility limit of calcium sulfite in said aqueous system, comprising the step of adding to said system an amount of a composition sufficient to provide 100% scale inhibition, said composition comprising a polyether polyamino methylene phosphonate of the following formula:

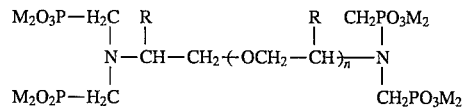

where n is an integer or fractional integer which is, or on average is, from about 2 to about 12, inclusive; M is hydrogen or a suitable cation; and each R may be the same or different and is independently selected from hydrogen and methyl;

TOGETHER WITH one or more homopolymers, copolymers and terpolymers comprising one or more monomers of acrylamide (AM), acrylic acid (AA), 2-acrylamide-methyl propane sulfonic acid (AMPSA), methacrylic acid (MAA), ethoxylated methacrylate, itaconic acid (IA), polyethylene glycol monomethacrylate (PGM), maleic anhydride (MAH), maleic acid (MA), t-butyl acrylamide, sodium styrene sulfonate (SSS), sodium vinyl sulfonate, hydroxy propyl acrylate, hydroxy propyl methacrylate, 3-allyloxy-2-hydroxy propane sulfonic acid (AHPS), and vinyl phosphonic acid, wherein the weight average molecular weight for such polymer additives is in the range of from about 500 to 250,000.

9. A method according to claim 8 wherein for the phosphonate composition, M is hydrogen, both R's are methyl, and n is an average of about 2.6, with a resultant molecular weight of about 600.

10. A method according to claim 8 wherein the phosphonate composition has the following structure, where "Z" is methylene phosphonite:

$$Z_2-N-\overset{R_z}{\underset{|}{C}}HCH_2-(OCH_2\overset{R_a}{\underset{|}{C}}H)_a-(OCH_2\overset{R_b}{\underset{|}{C}}H)_b-NZ_2$$

| a | b | $R_z$ | $R_a$ | $R_b$ |
|---|---|-------|-------|-------|
| 2   | 1 | CH₃ | H   | CH₃ |
| 2   | 0 | CH₃ | CH₃ | —   |
| 8.5*| 1 | CH₃ | H   | CH₃ |
| 5.6*| 0 | CH₃ | CH₃ | —   |
| 2   | 0 | H   | H   | —   |
| 3   | 0 | H   | H   | —   |
| 3   | 0 | CH₃ | CH₃ | —   |
| 3   | 1 | H   | CH₃ | H   |
| 4   | 0 | H   | CH₃ | —   |

\* = the value of "n" on average.

11. A method according to claim 8 wherein the polymer additive is selected from the group consisting of polyacrylic acid and copolymers of, by weight percent, 75/25 and 60/40 AA/AMPSA, 75/25 SSS/MA, 33/33/34 AA/MAA/IA, 50/50 AA/AM, and 70/20/10 AA/AMPSA/PGM-5 (having 5 repeating oxyethylene units), and AA/AMPSA/TBAM.

12. The method according to claim 8 additionally including adding to said system a steel corrosion inhibitor and a copper corrosion inhibitor.

13. A method according to claim 12 wherein the aqueous system being treated is a lime kiln gas scrubber system.

14. The method according to claim 12 wherein the steel corrosion inhibitor is hydroxyphosphonoacetic acid (HPA), and the copper corrosion inhibitor is tolyltriazole.

15. A method according to claim 8 wherein formation, deposition and adherence of calcium carbonate is also inhibited and said phosphonate and said polymer additive are together added to the aqueous system being treated in an amount sufficient to establish a concentration, on an active basis, of said additive, of from 5 to 30 ppm.

16. A method of inhibiting the formation, deposition, and adherency of scale-forming salts, including calcium sulfite, in a lime kiln flue gas scrubber system comprising flue gas scrubber means, aqueous solution spray means, and scrubber collection means, comprising the steps of a) passing dirty lime kiln flue gas into an inlet of said flue gas scrubber means;

b) spraying an aqueous solution using said aqueous solution spray means into the path of said dirty flue gas entering said flue gas scrubber means, thereby removing gas and particulate contaminants from said dirty flue gas and entraining contaminates from said dirty flue gas in said aqueous solution to yield a clean flue gas and a dirty aqueous solution;

c) venting said clean flue gas from said flue gas scrubber means; and d) collecting said dirty aqueous solution in said scrubber collection means, wherein said dirty aqueous solution has a pH of at least 8.5 and a calcium sulfite saturation level of at least 150 times the solubility limit of calcium sulfite in said dirty aqueous solution;

said aqueous solution including a scale inhibitor comprising an amount of a polyether polyamino methylene phosphonate of the formula:

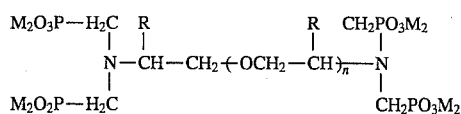

where n is an integer or fractional integer which is, or on average is, from about 2 to about 12, inclusive; M is hydrogen or a suitable cation; and each R may be the same or different and is independently selected from hydrogen and methyl.

17. The method of claim 16, wherein said polyether polyamino methylene phosphonate is split-fed, a portion thereof being fed to said aqueous solution prior to said aqueous solution spray means, and portion thereof being fed directly to said scrubber collection means.

18. The method of claim 16, comprising the additional step of adding sodium in the form of a compound selected from the group consisting of Na₂SO₄; NaOH; and Na₂CO₃ to lime mud being fed to a lime kiln generating said dirty flue gasses, thereby reducing dust generation in said kiln.

19. The method of claim 16, wherein said scale inhibitor further includes a polymer additive of one or more homopolymers, copolymers and terpolymers comprising one or more monomers of acrylamide (AM), acrylic acid (AA), 2-acrylamide-methyl propane sulfonic acid (AMPSA), methacrylic acid (MAA), ethoxylated methacrylate, itaconic acid (IA), polyethylene glycol monomethacrylate (PGM), maleic anhydride (MAH), maleic acid (MA), t-butyl acrylamide, sodium styrene sulfonate (SSS), sodium vinyl sulfonate, hydroxy propyl acrylate, hydroxy propyl methacrylate, 3-allyloxy-2-hydroxy propane sulfonic acid (AHPS), and vinyl phosphonic acid, wherein the weight average molecular weight for such polymer additive is in the range of from about 500 to 250,000.

20. The method of claim 19, wherein said polyether polyamino methylene phosphonate and said polymer additive are added as a mixture comprising 5–30 ppm on an active basis by weight of the mixture to the dirty aqueous solution.

* * * * *